United States Patent [19]

Berge

[11] 4,306,649
[45] Dec. 22, 1981

[54] ROTARY FEEDER MECHANISM FOR FRUIT JUICE EXTRACTING APPARATUS

[75] Inventor: Olav Berge, Monterey Park, Calif.

[73] Assignee: Brown International Corporation, Covina, Calif.

[21] Appl. No.: 138,131

[22] Filed: Apr. 7, 1980

[51] Int. Cl.³ .............................................. B65G 47/12
[52] U.S. Cl. .................................... 198/443; 198/492; 221/298; 414/223
[58] Field of Search ................................ 414/222-224, 414/753, 754; 198/392, 443, 492, 531; 221/298, 186, 265; 99/504, 549; 100/213

[56] References Cited

U.S. PATENT DOCUMENTS

| | | | |
|---|---|---|---|
| 2,581,732 | 1/1952 | Thompson | 198/443 X |
| 2,667,961 | 2/1954 | Reese et al. | 198/443 |
| 3,040,868 | 6/1962 | Waters | 198/489 X |
| 4,057,137 | 11/1977 | Hansen et al. | 198/443 |

FOREIGN PATENT DOCUMENTS 336324 10/1930 United Kingdom ................ 221/298

Primary Examiner—Leslie J. Paperner
Assistant Examiner—Terrance L. Siemens Attorney, Agent, or Firm—Paul A. Weilein

[57] ABSTRACT

A rotary feeder mechanism capable of attachment to and synchronized operation with a variety of different types of fruit juice extracting apparatus, in which a fruit receiving hopper is rotatable about a generally vertical or tilted axis of rotation, the received fruit being moved under centrifugal force to the hopper periphery area containing entrance openings to depending magazines in which the fruits are stored in stacked relation. The lower ends of the magazines are respectively arranged with a pair of spaced-apart gating fingers which are controlled by separate cam tracks to successively release the lowermost fruit in the magazine, while opposing release of the other fruits in the magazine, at a predetermined point of the hopper rotation. The cam tracks are adjustable to advance and retard the fruit release point, and provision is also made for the selective interchange of gating fingers having greater and lesser spacing in order to accommodate the average size of fruits to be handled in a particular locality. The cam tracks are further arranged for mounting as a unit at relatively raised and lowered positions along the axis of rotation of the hopper.

17 Claims, 10 Drawing Figures

ROTARY FEEDER MECHANISM FOR FRUIT JUICE EXTRACTING APPARATUS

BACKGROUND OF THE INVENTION

The present invention relates generally to object feeding mechanisms, and in the present instance is more particularly concerned with a mechanism for the feeding of fruit to a fruit juice extracting apparatus.

Fruit juice extracting apparatuses as currently being utilized in the industry includes a number of different types wherein the juice extracting components are co-ordinated to operate in a different manner. Regardless of the particular type, its potential capacity is determined by what may be termed the cup rate per minute passing through the reaming or extraction zone. However, the actual capacity of the juice extracting mechanism is measured by the actual percentage of cups that are loaded with fruit.

For example, in a juice extracting machine as disclosed in U.S. Pat. No. 3,103,239 in which fruit is conducted from a hopper to the juice extractor by means of chain conveyor mounted cups, a full hopper does not in practice load the fruit conveying cups to more than 60-65%. Thus, the actual capacity of this type of juice extractor can be materially increased by more fully loading the conveyor cups.

Also, in another well known juice extractor of the disc type, as disclosed in U.S. Pat. No. 3,161,123 wherein the whole fruit is conducted by a simple belt conveyor to a receiving opening for a pathway leading to the discs, the actual capacity is dependent upon the continuity of the supplied fruit and whether or not it is delivered at a maximum uniform rate rather than at non-uniform or reduced rate.

As will be apparent, the problem of feeding the fruit to the juice extracting apparatus becomes one of considerable importance, if the juice extracting apparatus is to be operated most efficiently, and as near as possible to its potential capacity.

Accordingly, as one solution of the problem, a number of rotating type feeding mechanisms have been developed and designed as a built-in component of the juice extracting apparatus.

One such arrangement is that exemplified by U.S. Pat. No. 3,858,500 which utilizes a horizontally rotatable feeder from which fruit is deflected by a fixed cam into a cross-over path leading to the juice extracting components. In practice, this arrangement is not entirely satisfactory under certain conditions, and fruit may be crushed, abraded or otherwise damaged. Moreover, soft or loose peel fruit such as tangerines could not be satisfactorily handled in this type of feeder.

Another known type of rotary feeder is that disclosed in U.S. Pat. No. 3,342,314, which utilizes a vertically rotatable feeder wheel for feeding the fruit from a side entry hopper into chain converyor pockets that carry the fruit to juice extracting reamers. Even with this type of feeder, all the pockets are not filled by the hopper, and the efficiency of this arrangement is of the order of about 75%.

The present invention seeks to provide an improved rotary feeder mechanism which is capable of being attached to and operable with different types of juice extracting apparatuses and, in particular, juice extracting apparatus such as disclosed in the above noted U.S. Pat. Nos. 3,103,239; 3,161,123; and 3,858,500 in which case it would be utilized to feed the fruit to the vertical rotary feeder as shown therein. Thus, use of the fruit feeding mechanism of the present invention with any one of the fruit juice extracting embodiments disclosed in these patents, would materially increase its efficiency of operation.

SUMMARY OF THE INVENTION

The present invention is more particularly concerned with the provision of a novel and unique rotary feeder that will more efficiently feed fruit to a juice extracting apparatus, and by means of which the efficiency of the juice extracting apparatus will be materially increased.

It is one object of the present invention to provide an improved feeder mechanism of the rotary type for successively feeding fruits one-by-one at a predetermined point of its rotation, and which is so fabricated that it may be operatively attached to and utilized in combination with a variety of types of juice extracting apparatuses, and which in use will increase the operating efficiency of the juice extracting apparatus.

A further object is to provide a unique feeder of the rotary type in which a rotatable hopper carries a plurality of magazines in which fruits are stored and released one-by-one by gating means at a predetermined point in the rotation of the hopper.

A still further object resides in the provision of a rotary feeder according to the previous object, wherein a pair of gating finger elements, associated with each magazine, are operable by unique camming means in response to the rotation of the hopper, to selectively move the fingers to gating and non-gating positions.

Another object is to provide a rotary feeder mechanism having a plurality of fruit storage magazines supported for unitary rotation about a generally upright axis of rotation, and normally fixed camming means for sequentially controlling gating means associated with each of the magazines to release a fruit therefrom at a predetermined point in the rotation, and wherein the camming means are adjustable to advance and retard the point of release.

Still another object is to provide a rotary feeder mechanism according to the previous object, in which the camming means are arranged to be mounted at selective spaced positions extending along the axis of rotation.

It is also an object to provide a rotary feeder mechanism in which a rotatable hopper carries a plurality of fruit storage magazines from each of which the release of fruit is controlled by a pair of spaced apart finger elements operatively supported by an adjacent bracket, and wherein interchangeable brackets enable the selection of different finger elements spacings for the feeding of fruits of different average sizes.

Further objects and advantages of the invention will be brought out in the following part of the specification, wherein detailed description is for the purpose of fully disclosing several adaptations of the invention without placing limitations thereon.

BRIEF DESCRIPTION OF THE DRAWINGS

Referring to the accompanying drawings, which are for illustrative purposes only.

DESCRIPTION OF A PREFERRED EMBODIMENT

Figure 1:
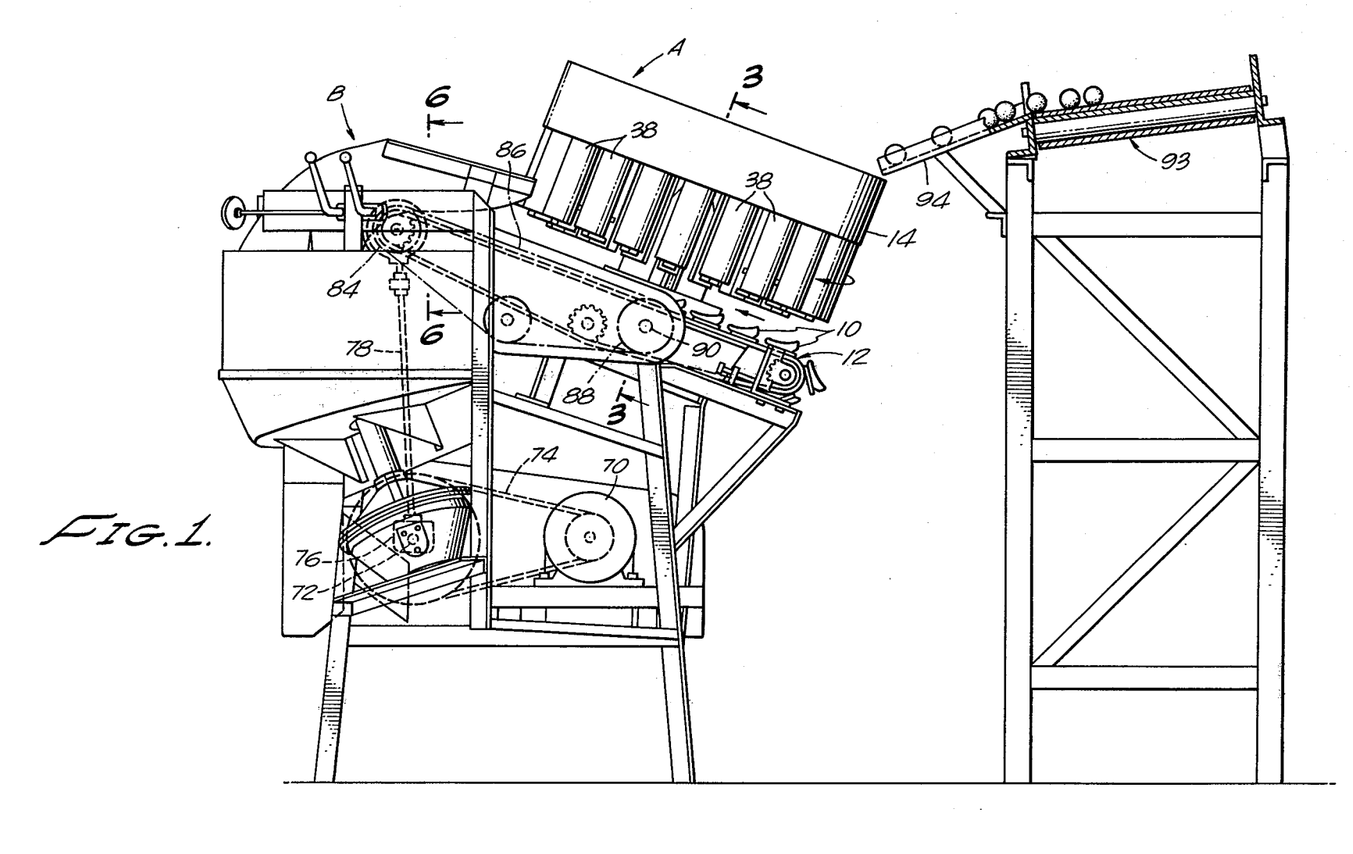
FIG. 1 is a side elevational view of one adaptation of a rotary feeder according to the present invention, the feeder being arranged to deliver fruit to the cups of a conveyor for transport to an associated juice extracting apparatus.
Figure 2:
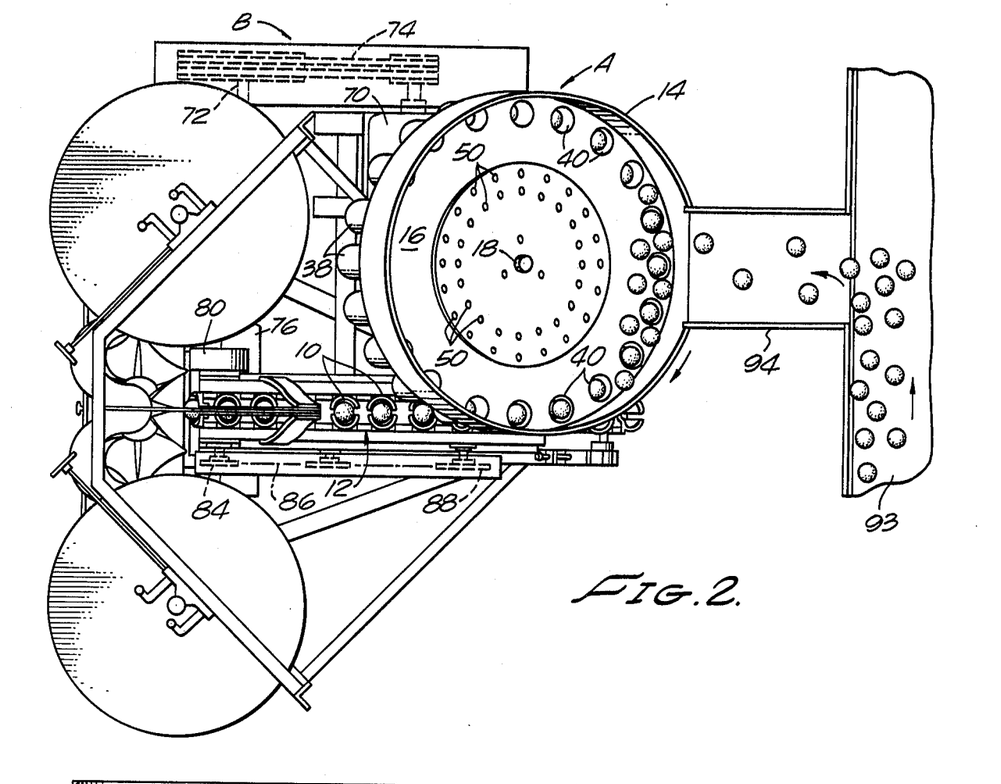
FIG. 2 is a fragmentary plan view of the rotary feeder arrangement as shown in FIG. 1.

Referring more specifically to the drawings, for illustrative purposes, the rotary feeder mechanism according to the present invention, as generally indicated at A in FIG. 1, is shown as being operatively applied to a juice extracting apparatus, as generally indicated at B, of the type in which fruits are delivered from the feeder to cups 10 of a chain type conveyor, as generally indicated by the numeral 12, for transport to the juice extracting components.

Figure 3:
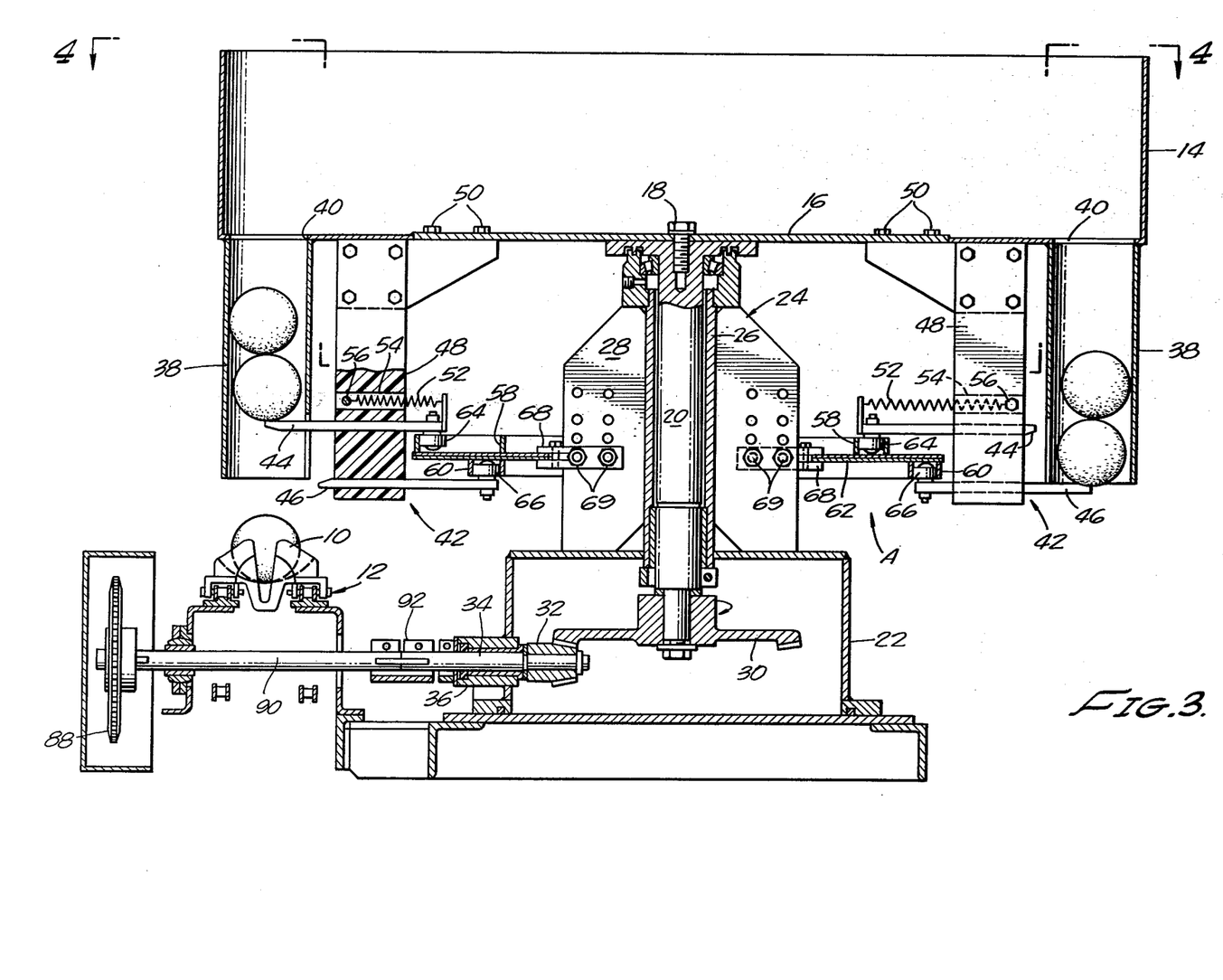
FIG. 3 is an enlarged diametral sectional view taken substantially on line 3—3 of FIG. 1, and showing the operative relationship of the components of the rotary feeder, and its driving connections.

As best shown in FIG. 3, the rotary feeder comprises a circular hopper 14 which is open at its top and has a planar bottom wall 16 which is centrally attached as by a securing bolt 18 to the upper end of a supporting shaft 20, this shaft being suitably supported by thrust and journal bearings mounted upon an upstanding frame structure which is secured to an adjacent part of the framing of the juice extracting apparatus A.

More specifically, the frame structure for supporting the hopper includes a gear housing 22 which is rigidly mounted on the juice extractor frame structure, and a pedestal spider 24 that is supported on the top of the housing and comprises a central tube 26 for the shaft 20, and a plurality of radially extending plate members 28 in the form of fins which are secured along their inner edges to the tube 26. In the disclosed adaptation, as illustrated in FIG. 1, the axis of rotation of the shaft 20 in indicated as being inclined or tilted at an angle of substantially 20° from the vertical. It will be understood, however, that in some adaptations, the shaft may be vertically disposed. In other adaptations, the shaft may be tilted even a greater amount.

The lower end of the shaft 20 carries a driving bevel gear 30 which is meshed with a drive pinion 32 secured to one end of a stub shaft 34 supported in a suitable bearing 36. The shaft extends through the wall of the housing 22 and has its outermost end arranged for coupling with a suitable driving power source of the juice extracting apparatus, so that the hopper will be rotated in timed relation to the operation of the juice extractor. This driving connection will be described subsequently more fully.

At its periphery the hopper 14 is provided with a plurality of circumferentially spaced depending tubular magazines 38, each of these magazines being in communication with the hopper through a bottom wall opening 40 by means of which fruit delivered to the hopper may be distributed to the magazines for storage and release in timed relation to the rotation of the hopper by gating means, as generally indicated at 42 in FIG. 3.

The gating means in each case includes at each magazine an upper pick-off or gating finger 44 and a lower pick-off or gating finger 46. These fingers are supported in spaced apart relation for longitudinal reciprocable movements to gating and non-gating positions by means of a support block 48 preferably of a suitable plastic. Each block 48 is removably supported in a depending position adjacent a magazine 38 by means of retaining bolts 50. The upper finger 44 is normally urged towards a gate closed position extending into the axial path of movement of fruit contained within the magazine. For this purpose, a tension spring 52 is connected at one end with the inner end of the finger 44, and the other end of the spring is positioned within a passage 54 where it is anchored by a retaining bolt 56.

Operative movements of the fingers 44 and 46 of each gating means are controlled by means of ring-shaped cam tracks 58 and 60, respectively, which are supported on opposite sides of an annular plate structure 62 which may comprise either a single plate or two plates in face-to-face engagement. A cam follower in the form of a rubber covered roller 64 is rotatably carried by the inner end of the finger 44 and operatively associated with the cam track 58, while a similar roller 66 at the inner end of the finger 46 is operatively associated with the cam track 60. The annular plate structure 62 is supported at its inner periphery by releasable clamping brackets 68 which are mounted to each of the plate members 28 by retaining bolts 69. These clamping brackets are also arranged to be positioned at different elevations along the axis of rotation of the hopper 14.

Since the rotary feeding mechanism of the present invention is adapted to be applied to different types of juice extracting apparatuses, the driving connections to the shaft 34 will, of course, depend upon where the most convenient power take-off connection can be made. In the case of the juice extracting apparatus as shown in FIG. 1, the power source comprises a main driving motor 70 that drives a horizontal shaft 72 through a V-belt driving connection 74. A rightangled gear box 76 connects the shaft 72 with a vertical shaft 78 (FIG. 6) which is connected at its upper end through beveled gearing 80 with a driving shaft 82 that drives the chain cup conveyor 12. The shaft 82 carries a driving sprocket 84 (FIG. 1) which is connected through a driving chain 86 with a sprocket 88 carried by a shaft 90 (FIG. 3) that is drivingly connected with the shaft 34 of the hopper drive by a suitable coupling 92. With the connection described above, it will be apparent that actuation of the hopper will be in synchronized timed relation to the operation of the components of the juice extracting apparatus.

In the operation of the present invention, fruit is fed into the hopper 14 from any suitable supply source which may comprise, for example, a conveyor belt 93 and a chute 94. Fruit deposited into the rotating hopper will be urged by centrifugal force towards the hopper perimeter and the area containing the openings 40 to the respective magazines 38. Fruit will fall by gravity into the magazines which can hold three to four fruits depending on their size. As the hopper rotates, the gating fingers will be controlled by their associated actuating cam tracks in a manner such that as each magazine approaches a predetermined point of discharge for releasing the lowermost fruit for movement into an underlying conveyor cup, the cam will retract the lower finger, while the cam track of the upper finger will enable it to be resiliently biased to a position in which it retains the other fruits within the magazine. It will be noted that the cam track 60 operates to positively move the finger 46 into its gating and non-gating positions. On the other hand, the cam track 58 is so arranged that the finger 44 will be positively retracted to a non-gating position only when the lower finger 46 is in an extended gating position with respect to the fruit in the magazine. When the lower finger 46 is positively retracted, then the cam track 58 of the upper finger 44 is such that this finger will be free to be resiliently biased by the spring 52 towards a gating position. Because there is no positive movement to this position, the danger of damaging the fruit will be minimized.

Figure 4:
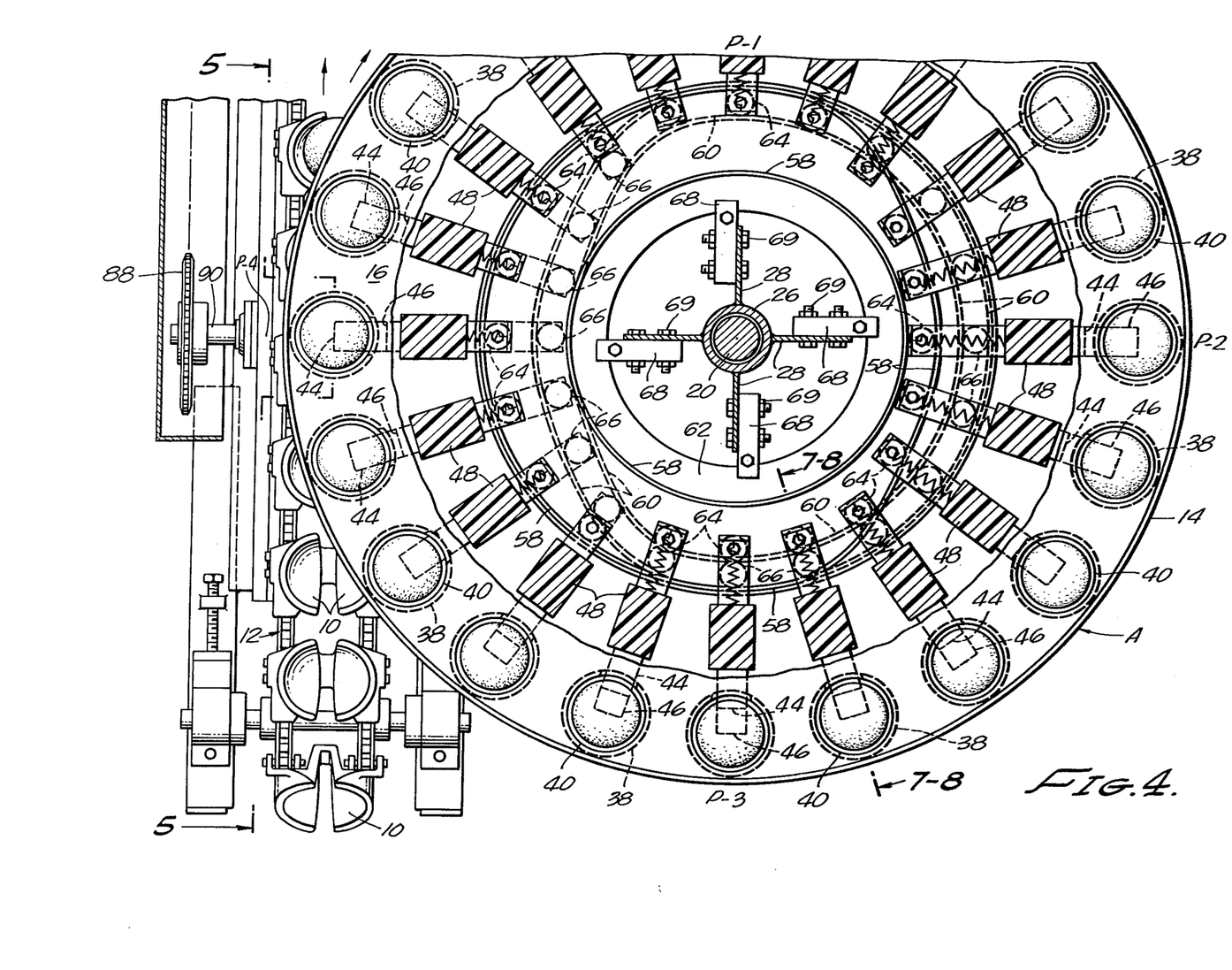
FIG. 4 is a fragmentary top plan view of the rotary feeder as viewed substantially along line 4—4 of FIG. 3, and showing the operative relationship between the gating fingers and associated actuating cam tracks.

As best seen in FIG. 4, the symmetrical configuration of the control cam tracks and the operation of the gating means is such that the rotary feeding mechanism will operate properly regardless of its direction of rotation. This permits its adaptation readily to the fruit conveyors of juice extracting apparatus in which the conveyors may travel in opposite directions.

The operative positions of the gating fingers at the respective circumferential positions of the hopper magazines are clearly shown in FIG. 4, and for the quadrant positions, as indicated at P-1, P-2, P-3 and P-4, it will be seen that the relative positions of the fingers will be as follows:

P-1. Both fingers 44 and 46 will be in gating position.
P-2. Upper finger 44 will be in retracted non-gating position, and bottom finger 46 will be in extended gating position.
P-3. The fingers will be the same as in the case of P-1.
P-4. In this position, which is the unloading position, the upper finger 44 is extended to a gating position, while the lower finger 46 is retracted to a non-gating position.

Figures 5, 6:
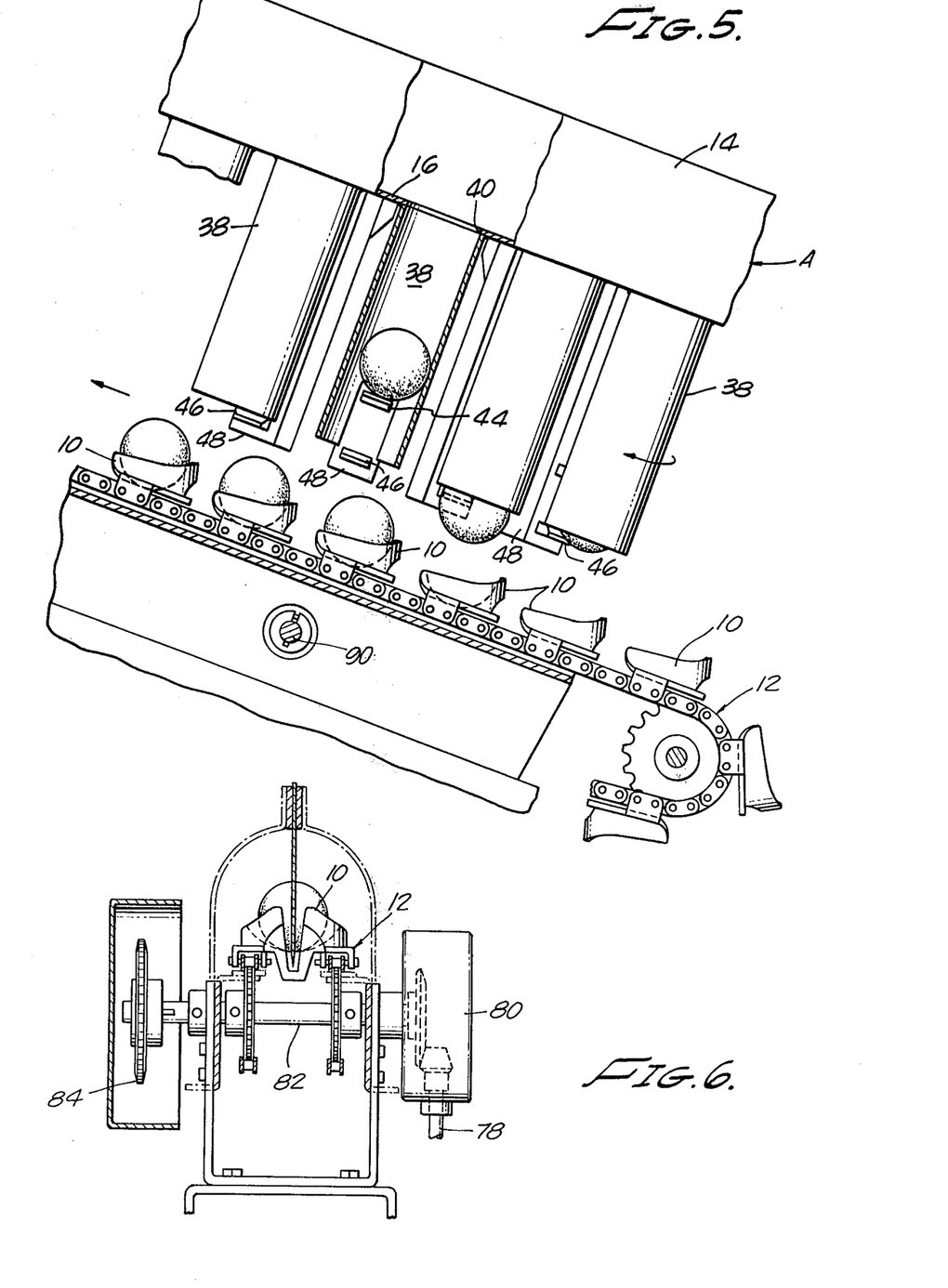
FIG. 5 is a fragmentary side elevational view, substantially along line 5—5 of FIG. 4, to show the relationship between the fruit storage magazines and the cups of the conveyor, as the fruit is released from the magazines.
FIG. 6 is a vertical transverse sectional view, taken substantially on line 6—6 of FIG. 1 and showing the driving connections for the fruit transporting conveyor.

As shown in FIG. 5, the release of the fruit from the magazine takes place slightly in advance of the magazine reaching the discharge or quadrant position P-4. Thus, as the empty cup reaches position P-4, the fruit will have been deposited therein. The timed relation for the release of the fruit at the unloading position may be advanced and retarded as required by circumferentially shifting the position of the annular plate structure 62 which supports the cam tracks.

The rotary feeding mechanism of the present invention is also readily adapted for the handling of different average sized fruits of a particular locality. For such purpose, interchangeable support blocks 48 are provided wherein the spacing between the upper finger 44 and lower finger 46 is increased or decreased depending upon the size of fruit to be handled. The position of the cam tracks is readily adjustable to accommodate this change of support blocks 48.

Figure 7:
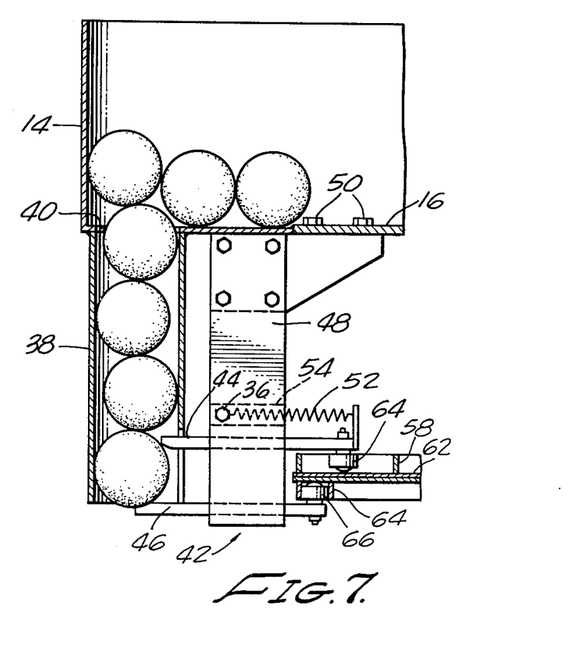
FIG. 7 is a fragmentary sectional view, taken substantially on line 7—7 of FIG. 4, showing the relationship between large fruit in the magazine and the gating fingers.
Figure 8:
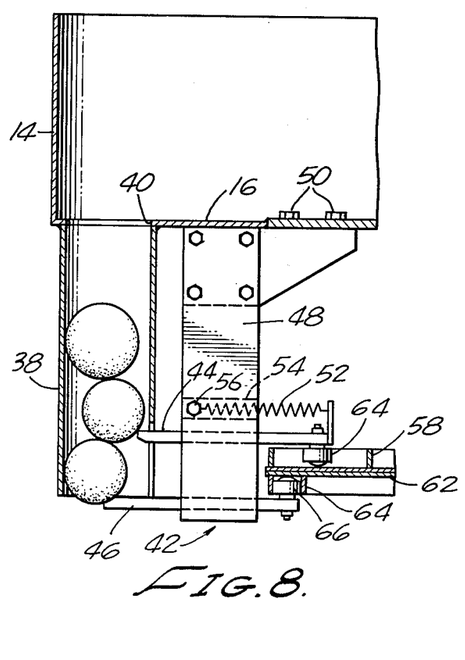
FIG. 8 is a similar view to that of FIG. 7, but showing a mixture of small and large fruit in the magazine.

FIGS. 7 and 8 illustrate the capability of the gating fingers to handle large sized fruits as indicated in FIG. 7, and mixed large and small sized fruits as indicated in FIG. 8. The lower finger 46 is positively held in gating position by its associated cam track, and since the upper finger 44 is resiliently biased towards its gating position, it will readily adapt itself to a proper position irrespective of whether the bottom fruit in the magazine is a large fruit or a small fruit. If it is a large fruit, the upper finger 44 will engage the bottom fruit, as shown in FIG. 7. However, in the case of smaller fruits, the upper finger 44 will be biased inwardly into engagement with the next fruit above the bottom fruit of the magazine, as shown in FIG. 8. In either case, the possibility of injuring the fruit is greatly minimized.

Figure 9:
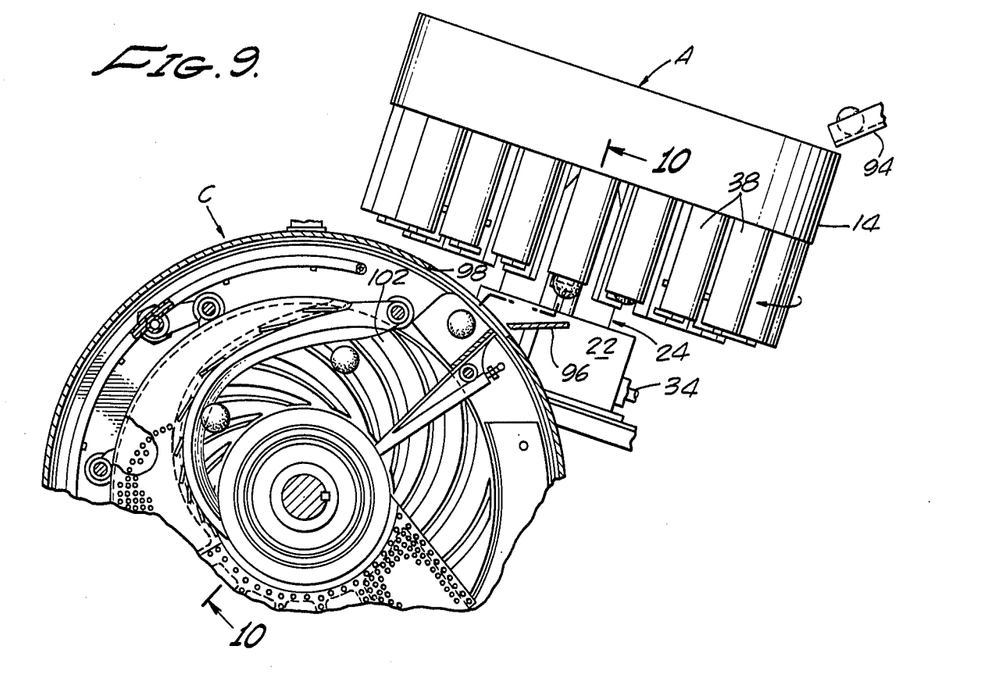
FIG. 9 is a fragmentary side elevational view, partly in section, and showing the rotary feeder of the present invention as being arranged to deliver fruit to a juice extractor of the disc type.
Figure 10:
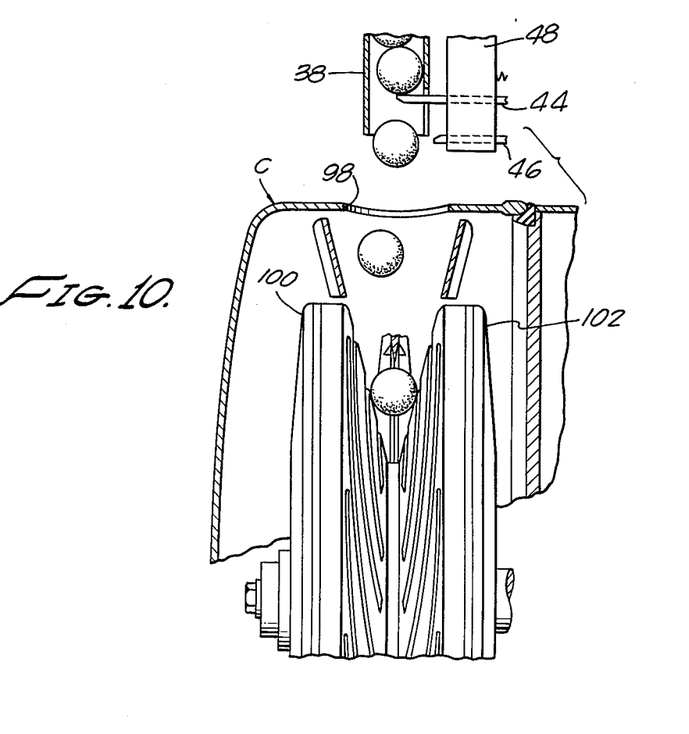
FIG. 10 is a fragmentary sectional view, taken substantially on line 10—10 of FIG. 9, and showing the path of movement of fruit released from the magazines at regular intervals.

FIGS. 9 and 10 illustrate another adaptation of the present invention, wherein the rotary feeder mechanism is disclosed as being applied to juice extracting apparatus C of the rotatable disc type.

In this adaptation the discharge point of the rotary feeding mechanism is oriented so as to discharge fruit directly onto an inclined platform 96 at a fruit receiving opening 98 which is in communication with fruit movement paths in which the entering fruit is moved between the juice extracting discs 100 and 102 of conventional construction. In this adaptation of the rotary feeding mechansim, the drive shafts 34 may be connected through a suitable connection with the power source of the juice extracting apparatus, or may be driven from a separate power source at a uniform proper speed to successively release the fruit at predetermined uniform intervals for movement into the juice extractor.

From the foregoing description and drawings, it will be clearly evident that the delineated objects and features of the present invention will be accomplished.

Various modifications may suggest themselves to those skilled in the art without departing from the spirit of the disclosed invention and, hence, it is not wished to be restricted to the specific forms shown or uses mentioned, except to the extent indicated in the appended claims.

What is claimed is:

1. A rotary feeder mechanism for feeding fruit to a fruit juice extracting apparatus, comprising:
 a frame;
 a circular hopper having a bottom wall;
 means for supporting said hopper on said frame for rotation about a generally upright axis;
 a plurality of circumferentially spaced tubular magazines depending from the bottom wall of said hopper, each of said magazines having an upper end fruit receiving opening in said bottom wall positioned inwardly of the hopper periphery for receiving fruit from the hopper;
 gating means at the lower end of each of said magazines operative to normally oppose exit of fruit from the lower end of the magazine; and
 means for actuating said gate means in timed relation to the rotation of the hopper to release a single fruit from each magazine at a predetermined point in the rotation of the hopper.

2. A rotary feeder according to claim 1, in which: the axis of rotation of the hopper is tilted from the vertical.

3. A rotary feeder according to claim 1, in which: said gate actuating means comprises cam means.

4. A rotary feeder according to claim 3, in which:
the gate means comprises a pair of vertically spaced control pick-off finger elements; and
the cam means comprises one cam track for controlling the actuation of one of said finger elements, and another cam track for controlling the actuation of the other of said finger elements.

5. A rotary feeder according to claim 4, in which:
a bracket member carried by the hopper and positioned adjacent each magazine provides a support for the finger elements associated therewith, each of said finger elements being supported in the bracket for longitudinal axial movements between an extended position projecting into the path of movement of fruit in the magazine, and a retracted position withdrawn from the path of movement of the fruit in the magazine.

6. A rotary feeder according to claim 4, in which:
said one of said finger elements is positioned adjacent the lower end of said magazine, and the other of said finger elements is positioned inwardly of the lower end of said magazine; and
said cam tracks are operative to control said fingers so as to release the lowermost fruit in the magazine at said predetermined point in the rotation of the hopper, while opposing exit of other fruit in the magazine.

7. A rotary feeder according to claim 6, in which:
the cam track of said one of said finger elements positively actuates it between gate closed and gate open positions;
the cam track of said other of said finger elements positively actuates it to a gate open position; and
spring means normally resiliently biases said other finger element towards a gate closed position.

8. A rotary feeder according to claim 3, in which:
support means are provided for the cam means enabling angular adjustment thereof circumferentially in relation to the axis of rotation of said hopper, whereby the timed release point of the fruit from a magazine may be adjustably advanced and retarded.

9. A rotary feeder according to claim 8, in which the cam means support comprises:
an annular plate structure in surrounding relation to the axis of rotation of said hopper; and
a plurality of circumferentially spaced clamps are mounted on said frame for releasably gripping and supporting the plate structure in an operative adjusted position.

10. A rotary feeder according to claim 9, in which:
said clamps are securable to said frame at selective spaced intervals along the axis of rotation of the hopper to vary the relative axial position of the annular plate structure.

11. A rotary feeder according to claim 9, in which:
the cam means includes cam tracks respectively on the upper side of the plate structure and the underside of the plate structure.

12. A rotary feeder according to claim 5, in which:
interchangeable brackets are provided for supporting the finger elements in greater or lesser spaced apart relation, depending upon the average size fruits to be fed to the associated juice extracting apparatus.

13. A rotary feeder according to claim 1, in which:
driving means for said hopper includes a driving connection with driving means for the juice extractor apparatus, whereby relese of fruit from each magazine at the predetermined point will be in synchronized timed relation to the operation of the juice extractor apparatus.

14. A rotary feeder according to claim 13, in which:
a cup conveyor is operable to successively carry fruit to a receiving entrance of the fruit extracting apparatus; and
the gating means of the magazines are successively operable at the point of release to deliver fruit in timed relation into the conveyor cups.

15. A rotary feeder according to claim 14, in which:
the cup conveyor has a drive shaft for driving the conveyor in timed relation to the operation of the juice extracting apparatus; and
said driving means for the hopper includes a connection with the drive shaft of the conveyor.

16. A rotary feeder according to claim 1, in which:
a belt conveyor supplies fruit to the rotatable hopper; and
fruit in the hopper is moved under the action of centrifugal force towards the outer periphery of the hopper and the area containing the receiving openings of the magazines.

17. A rotary feeder mechanism capable of attachment to a variety of different types of fruit juice extracting apparatus, and being operable to successively feed fruit one-by-one to the apparatus in timed relation to the operation of the fruit juice extracting components, comprising:
a frame structure;
a hopper supported on said frame structure for rotation about a generally vertical axis of rotation;
a plurality of magazines carried by said hopper for respectively receiving and storing a plurality of fruits in stacked relation therein; and
gating means operatively associated with each of said magazines for successively releasing single fruits from each magazine in response to the rotational movement of the hopper, and upon each magazine reaching a predetermined circumferential point in the rotation of the hopper.

* * * * *